United States Patent
Aryanpour et al.

(10) Patent No.: US 10,916,772 B2
(45) Date of Patent: Feb. 9, 2021

(54) HIGH CAPACITY SODIUM-ION BATTERY POSITIVE ELECTRODE MATERIAL

(71) Applicant: Samsung Electronics Co., Ltd., Gyeonggi-do (KR)

(72) Inventors: Masoud Aryanpour, Malden, MA (US); Young-Gyoon Ryu, Lexington, MA (US); Yan Wang, Brookline, MA (US)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 260 days.

(21) Appl. No.: 15/866,040

(22) Filed: Jan. 9, 2018

(65) Prior Publication Data

US 2018/0294480 A1    Oct. 11, 2018

Related U.S. Application Data

(60) Provisional application No. 62/482,037, filed on Apr. 5, 2017.

(51) Int. Cl.
*H01M 4/48* (2010.01)
*H01M 10/24* (2006.01)
(Continued)

(52) U.S. Cl.
CPC .............. *H01M 4/48* (2013.01); *C01G 37/00* (2013.01); *C01G 49/0027* (2013.01);
(Continued)

(58) Field of Classification Search
CPC ............. H01M 4/02; H01M 4/13–131; H01M 4/139–1391; H01M 4/48; H01M 4/485;
(Continued)

(56) References Cited

U.S. PATENT DOCUMENTS 7,791,060 B2    9/2010    Aochi et al.
7,988,848 B2    8/2011    Brignac et al.
(Continued)

FOREIGN PATENT DOCUMENTS

JP    2010040311    2/2010
JP    2014164860    9/2014
(Continued)

OTHER PUBLICATIONS

Machine Translation of Kuze et al. (JP 2010-040311). (Year: 2010).*
(Continued)

*Primary Examiner* — Jonathan Crepeau
*Assistant Examiner* — Jacob Buchanan
(74) *Attorney, Agent, or Firm* — Cantor Colburn LLP (57) ABSTRACT

A positive electrode active material for a sodium ion battery includes a sodium complex oxide of the formula $Na_4(M^1_aM^2_{1-a})_2O_5$ having an orthorhombic crystal structure, wherein $M^1$ and $M^2$ are each independently Ti, Cr, Fe, Co, Ni, Mn, V, or a combination there of provided that $M^1$ and $M^2$ are different from each other; and $0 \leq a \leq 1$.

19 Claims, 11 Drawing Sheets

(51) Int. Cl.
*H01M 10/04* (2006.01)
*H01M 4/04* (2006.01)
*H01M 4/485* (2010.01)
*H01M 4/525* (2010.01)
*H01M 4/02* (2006.01)
*H01M 10/054* (2010.01)
*C01G 37/00* (2006.01)
*C01G 53/00* (2006.01)
*C01G 51/00* (2006.01)
*C01G 49/00* (2006.01)

(52) U.S. Cl.
CPC .............. *C01G 51/42* (2013.01); *C01G 53/42* (2013.01); *H01M 4/0471* (2013.01); *H01M 4/485* (2013.01); *H01M 4/525* (2013.01); *H01M 10/04* (2013.01); *H01M 10/24* (2013.01); *C01P 2002/72* (2013.01); *C01P 2006/40* (2013.01); *H01M 10/054* (2013.01); *H01M 2004/028* (2013.01)

(58) Field of Classification Search
CPC ........... H01M 4/52; H01M 4/523–525; H01M 10/05; H01M 10/054; H01M 10/24
See application file for complete search history.

(56) References Cited

U.S. PATENT DOCUMENTS

| | | | |
|---|---|---|---|
| 8,097,872 B2 | 1/2012 | Kreupl | |
| 8,350,244 B2 | 1/2013 | Noshiro | |
| 8,369,151 B2 | 2/2013 | Yoneya et al. | |
| 8,574,956 B2 | 11/2013 | Phatak et al. | |
| 8,835,041 B2 | 9/2014 | Johnson et al. | |
| 8,921,156 B2 | 12/2014 | Phatak et al. | |
| 2002/0192553 A1 | 12/2002 | Barker et al. | |
| 2003/0118877 A1 | 6/2003 | Armand et al. | |
| 2006/0204830 A1 | 9/2006 | Ovshinsky et al. | |
| 2009/0159838 A1* | 6/2009 | Okada | H01M 4/525 252/182.1 |
| 2009/0272959 A1 | 11/2009 | Phatak et al. | |
| 2010/0065836 A1 | 3/2010 | Lee | |
| 2013/0168632 A1 | 7/2013 | Moon et al. | |
| 2016/0365575 A1* | 12/2016 | Natsui | C01G 45/1285 |

FOREIGN PATENT DOCUMENTS

| | | |
|---|---|---|
| KR | 20170003305 | 1/2017 |
| WO | 2016085726 | 6/2016 |

OTHER PUBLICATIONS

Brachtel, G. and Hoppe, R. (1980), Die Koordinationszahl 5 bei Mn(III): Na4Mn2O5 [1,2]. Z. anorg. allg. Chem., 468: 130-136. First published Sep. 1980. https://doi.org/10.1002/zaac.19804680116. (Year: 1980).*

Machine translation of Brachtel, G. and Hoppe, R. (1980), Die Koordinationszahl 5 bei Mn(III): Na4Mn2O5 [1,2]. Z. anorg. allg. Chem., 468: 130-136. First published Sep. 1980. https://doi.org/10.1002/zaac.19804680116. (Year: 1980).*

Brachtel Von G. et al., "New Oxoferrates(III). On the Knowledge of NA4Fe2O5", Z. anorg. Allg. Chem. 446, (1978); pp. 97-104 (with English Abstract).

* cited by examiner

HIGH CAPACITY SODIUM-ION BATTERY POSITIVE ELECTRODE MATERIAL

CROSS REFERENCE TO RELATED APPLICATIONS

This application claims the benefit, under 35 U.S.C. § 119(e), of U.S. Provisional Patent Application Ser. No. 62/482,037, filed on Apr. 5, 2017, which is incorporated herein by reference in its entirety.

BACKGROUND

Lithium (Li) ion batteries, while being the most prominent type of rechargeable battery for portable electronics applications, have limited applicability because of the high cost of lithium and their safety. Sodium (Na) ion batteries on the other hand, although not as developed as lithium-ion batteries, present numerous unsolved challenges. For example, sodium-ion batteries currently provide significantly less capacity than lithium-ion batteries.

Therefore, in order to overcome the technical challenges associated with Na-ion batteries, there remains a need for electrode materials which provide improved capacity, in particular, an improved sodium-ion positive electrode active material.

BRIEF DESCRIPTION

A positive electrode active material for a sodium ion battery includes a sodium complex oxide of the formula $Na_4(M^1_aM^2_{1-a})_2O_5$ having an orthorhombic crystal structure, wherein $M^1$ and $M^2$ are each independently Ti, Cr, Fe, Co, Ni, Mn, V, or a combination thereof, provided that $M^1$ and M2 are different from each other; and $0 \leq a \leq 1$.

A sodium ion battery including the positive electrode active material is also described.

A sodium ion battery includes a positive electrode including the positive electrode active material; a negative electrode; and an electrolyte between the positive electrode and negative electrode.

Also disclosed is a method of manufacturing the positive electrode active material for a sodium-ion battery, the method including: heat treating a sodium source and a material comprising $M^1$ and $M^2$, wherein $M^1$ and $M^2$ are each independently Ti, Cr, Fe, Co, Ni, Mn, V, or a combination thereof, provided that $M^1$ and $M^2$ are different from each other, to manufacture the positive electrode active material.

Also disclosed is a method of manufacturing a sodium-ion battery, the method including: providing the positive electrode active material; providing a negative electrode; and disposing an electrolyte between the positive electrode and negative electrode to manufacture the sodium-ion battery.

The above described and other features are exemplified by the following figures and detailed description.

BRIEF DESCRIPTION OF THE DRAWINGS

The following figures are exemplary embodiments wherein the like elements are numbered alike.

DETAILED DESCRIPTION

The present inventors have discovered that a sodium metal oxide can form an orthorhombic structure, and that such orthorhombic materials provide unexpectedly improved electrochemical properties relative to materials having a similar chemical composition and a distinct, e.g., monoclinic, structure. The disclosed sodium metal oxide provides a voltage and a capacity suitable to power modern devices, and thus could be used to provide a sodium-ion battery suitable for a portable electronics application. Specifically, disclosed herein are a class of sodium oxides including binary metals and advantageously having a unique structure, which, while not wanting to be bound by theory, is understood to provide advantageous properties.

Disclosed is a positive electrode active material for a sodium ion battery. The positive electrode active material comprises a sodium complex oxide of the formula $Na_4(M^1_aM^2_{1-a})_2O_5$. In the foregoing formula, $M^1$ and $M^2$ are each independently Ti (titanium), Cr (Chromium), Fe (iron), Co (cobalt), Ni (nickel), Mn (manganese), V (vanadium), or a combination thereof, provided that $M^1$ and $M^2$ are different from each other; and $0 \leq a \leq 1$. In some embodiments, $M^1$ and $M^2$ comprise Fe, Co, or a combination thereof. For example, $M^1$ can be Fe, and in some embodiments, $M^1$ can be Fe and $M^2$ can be Co or Ni. In an embodiment, $M^1$ can be Co, and in some embodiments when $M^1$ is Co, $M^2$ can be Cr or Ti. In some embodiments, $M^1$ and $M^2$ can be present in a molar ratio of 7:1 to 1:7, for example 6:1 to 1:6, or 5:1 to 1:5, or 3:1 to 1:3.

Figure 5:
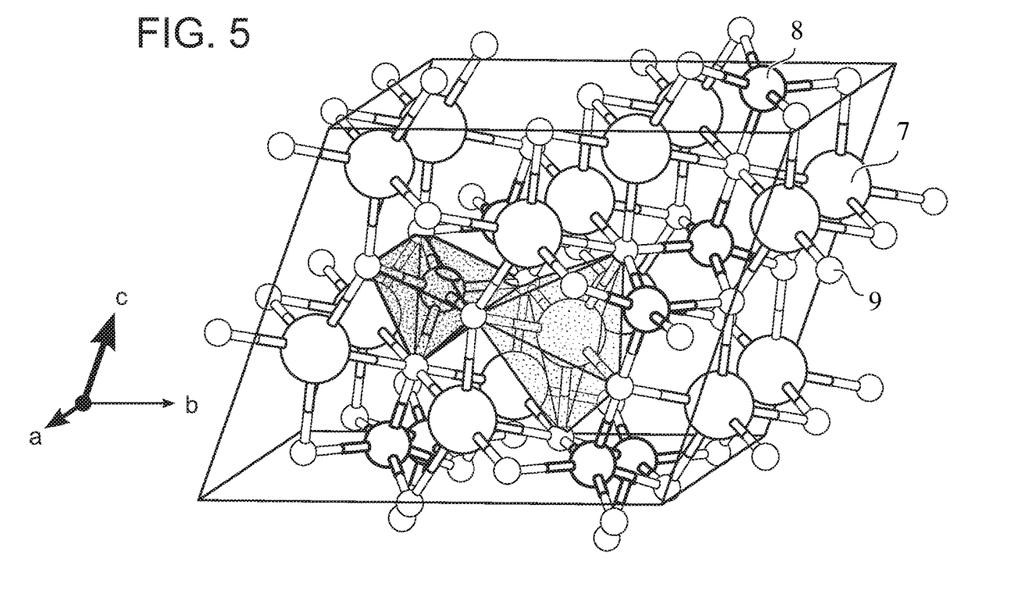
FIG. 5 shows the coordination geometry of an exemplary structure of a sodium complex oxide wherein $M^1$ is Fe and a is 1.

The sodium complex oxide advantageously has an orthorhombic crystal structure. In some embodiments, in the crystal structure of the sodium complex oxide, sodium and $M^1$ are each independently coordinated by oxygen in a square pyramidal or trigonal pyramidal geometry. FIG. 5 shows an exemplary structure of a sodium complex oxide wherein $M^1$ is Fe and a is 1. In FIG. 5, sodium is labelled "7", $M^1$ (e.g., iron) is labelled "8", and oxygen is labelled "9." As can be seen FIG. 5, the Na and Fe of the exemplary structure each has a coordination number of 5 with oxygen, wherein the both of Na and Fe are coordinated by oxygen in a square pyramidal or trigonal pyramidal geometry.

In some embodiments, the sodium complex oxide can have a structure which belongs to an Fddd space group.

In some embodiments, the sodium complex oxide preferably comprises $Na_4Fe_2O_5$, $Na_4Co_2O_5$, $Na_4Fe_{1.5}Co_{0.5}O_5$, $Na_4Fe_{0.75}Ni_{1.25}O_5$, $Na_4Fe_{1.25}Ni_{0.75}O_5$, $Na_4Cr_{0.75}Co_{1.25}O_5$, $Na_4CrCoO_5$, $Na_4Fe_{0.25}Ni_{1.75}O_5$, $Na_4Ti_{0.5}Co_{1.5}O_5$, $Na_4Cr_2O_5$, $Na_4Ni_2O_5$, or a combination thereof.

The positive electrode active material described herein can advantageously exhibit one or more of the following properties.

In some embodiments, the electrode active material can exhibit an average voltage of 2.6 to 3.3 volts versus $Na/Na^+$.

In some embodiments, the electrode active material exhibits a capacity of greater than 360 mAh/g, for example greater than 360 to 400 mAh/g, or 365 to 390 mAh/g.

X-ray diffraction patterns can be useful in characterizing compounds such as those described herein. In some embodiments, the sodium complex oxide has an orthorhombic structure. In an embodiment, the sodium complex oxide has an X-ray diffraction pattern which can be indexed to an orthorhombic symmetry. Also, in an embodiment, the sodium complex oxide has a peak, e.g., a reflection, at 19 to 22 degrees 2θ, or 19.5 to 21.5 degrees 2θ, or 19.75 to 21.25 degrees 2θ, or 20 to 21 degrees 2θ, when analyzed by powder X-ray diffraction using Cu Kα radiation. In some embodiments, the sodium complex oxide has a peak at 32 to 35 degrees 2θ, or 32.5 to 34.5 degrees 2θ, or 32.75 to 34.25 degrees 2θ, or 33 to 34 degrees 2θ, when analyzed by powder X-ray diffraction using Cu Kα radiation. In some embodiments, the sodium complex oxide has a peak at 36 to 39 degrees 2θ, or 36.5 to 38.5 degrees 2θ, or 36.75 to 38.25 degrees 2θ, or 37 to 38 degrees 2θ, when analyzed by powder X-ray diffraction using Cu Kα radiation. In some embodiments, the sodium complex oxide has a peak at 40 to 43 degrees 2θ, or 40.5 to 42.5 degrees 2θ, or 40.75 to 42.25 degrees 2θ, or 41 to 42 degrees 2θ, when analyzed by powder X-ray diffraction using Cu Kα radiation. In some embodiments, the sodium complex oxide can be characterized by having one or more of the foregoing major peaks when analyzed by powder X-ray diffraction using Cu Kα radiation. As noted above, and while not wanting to be bound by theory, it is understood that the sodium complex oxide has an orthorhombic structure, and can have at least one of the foregoing peaks, when analyzed by powder X-ray diffraction using Cu Kα radiation. For example, the sodium complex oxide can have one, two, three, of four of the foregoing major peaks when analyzed by powder X-ray diffraction using Cu Kα radiation.

Sodium complex oxides can exhibit a variety of crystallographic symmetries. A sodium complex oxide having orthorhombic structure has been discovered, and in an embodiment has an Fddd space group. Surprisingly, sodium metal oxide materials having this symmetry advantageously exhibit the improved properties which are desirable for providing improved sodium ion batteries. Furthermore, use of the materials having the orthorhombic symmetry can avoid some of the technical limitations associated with the use of similar materials having a different crystal structure (e.g., materials having a monoclinic crystal structure).

Another aspect of the present disclosure is a method for the manufacture of the positive electrode active material for use in a sodium-ion battery. The method includes heat treating a sodium source and a material comprising $M^1$ and optionally $M^2$, wherein $M^1$ and $M^2$ are each independently Ti, Cr, Fe, Co, Ni, Mn, V, or a combination thereof, provided that $M^1$ and $M^2$ are different from each other, to manufacture the positive electrode active material.

Another aspect of the present disclosure is a sodium ion battery. The sodium ion battery comprises the positive electrode active material described above. The sodium ion battery can have any suitable shape, can be prismatic or cylindrical, and can be fabricated in a shape such as a cylinder, a prism, a disk, or a sheet. The shape of sodium ion battery is not limited to the above mentioned shapes, and can be shaped in various forms other than the foregoing. The sodium ion battery can include a positive electrode including the positive electrode active material, a negative electrode, and an electrolyte between the positive electrode and the negative electrode. The sodium ion battery can further include a separator disposed between the positive electrode and the negative electrode.

Figure 1:
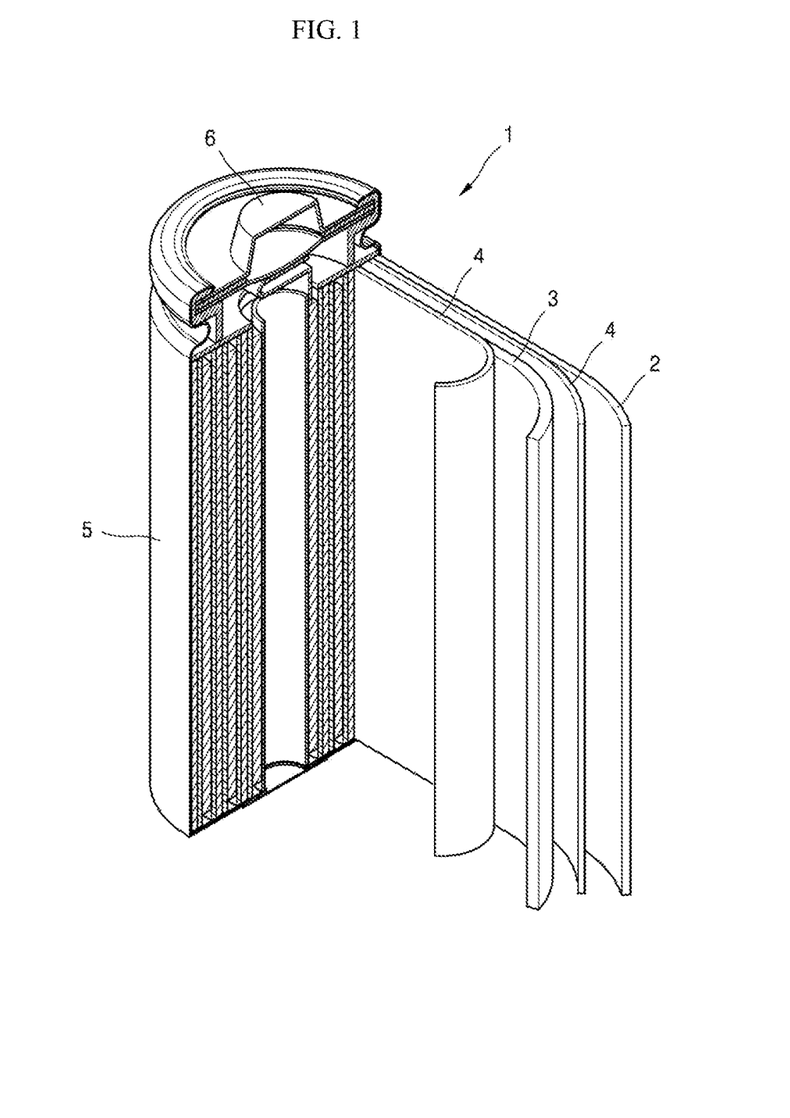
FIG. 1 is a schematic view of an exemplary embodiment of a sodium ion battery.

Referring to FIG. 1, a sodium battery 1 according to an embodiment can include a cathode 3, an anode 2, and a separator 4. In some embodiments, the cathode 3, the anode 2, and the separator 4 may be wound or folded, and then sealed in a battery case 5. In some embodiments, the battery case 5 may be filled with an organic electrolyte solution and sealed with a cap assembly 6, thereby completing the manufacture of the sodium battery 1. In some embodiments, the battery case 5 may have a cylindrical, rectangular, or thin-film shape. For example, the sodium battery 1 may be a large-sized thin-film-type battery.

In some embodiments, the separator 4 may be disposed between the cathode 3 and the anode 2 to form a battery assembly. In some embodiments, the battery assembly may be stacked in a bi-cell structure and impregnated with the electrolyte solution. In some embodiments, the resultant assembly may be put into a pouch and hermetically sealed, thereby completing the manufacture of a sodium ion polymer battery.

In some embodiments, a plurality of battery assemblies may be stacked to form a battery pack, which may be used in any device that requires high capacity and high output, for example, in a laptop computer, a smartphone, or an electric vehicle.

The positive electrode can be produced by providing a positive electrode active material composition including the positive electrode active material which can be manufactured as described above, and optionally, a conductive agent, and a binder.

The binder can facilitate adherence between components of the positive electrode, such as the positive active material and the conductor, and adherence of the positive electrode to a current collector. Examples of the binder can include polyacrylic acid (PAA), polyvinylidene fluoride, polyvinyl alcohol, carboxymethyl cellulose (CMC), starch, hydroxypropyl cellulose, regenerated cellulose, polyvinylpyrrolidone, tetrafluoroethylene, polyethylene, polypropylene, ethylene-propylene-diene monomer (EPDM), sulfonated EPDM, styrene-butadiene-rubber, fluorinated rubber, a copolymer thereof, or a combination thereof. The amount of the binder can be in a range of about 1 part by weight to about 10 parts by weight, for example, in a range of about 2 parts by weight to about 7 parts by weight, based on a total weight of the positive active material. When the amount of the binder is in the range above, e.g., about 1 part by weight to about 10 parts by weight, the adherence of the positive electrode to the current collector may be suitably strong.

The conductive agent can include, for example, carbon black, carbon fiber, graphite, or a combination thereof. The carbon black can be, for example, acetylene black, Ketjen black, Super P carbon, channel black, furnace black, lamp black, thermal black, or a combination thereof. The graphite can be a natural graphite or an artificial graphite. A combination comprising at least one of the foregoing can be used. The positive electrode can additionally include an additional conductor other than the carbonaceous conductor described above. The additional conductor can be an electrically conductive fiber, such as a metal fiber; a metal powder such as a fluorinated carbon powder, an aluminum powder, or a nickel powder; a conductive whisker such as a zinc oxide or a potassium titanate; or a polyphenylene derivative. A combination comprising at least one of the foregoing can be used.

The negative electrode can be produced from a negative active material composition including a negative active material, and optionally, a conductive agent, and a binder. The negative active materials that can be used in the sodium ion battery include materials capable of storing and releasing sodium ions electrochemically. Such negative electrode active material can be a well-known negative electrode active material for sodium ion batteries such as hard carbon, soft carbon, carbon black, ketjen black, acetylene black, activated carbon, carbon nanotubes, carbon fiber, amorphous carbon, and other carbon materials. Also usable are sodium containing metals and alloys, wherein the metal can be any suitable metal, e.g., Sn, Sb, Ge. Sodium containing metal oxides, metal nitrides, and metal sulfides are also useful, in particular wherein metal can be Ti, Mo, Sn, Fe, Sb, Co, V. Also useable are phosphorous (P) or metal doped phosphorous (e.g., $NiP_3$). The negative active material is not limited to the foregoing and any suitable negative active material can be used.

As the separator, a porous olefin film such as polyethylene and polypropylene, and polymer electrolyte can be used. The separator can be porous, and a diameter of a pore of the separator can be in a range of about 0.01 μm to about 10 μm, and a thickness of the separator can be in a range of about 5 μm to about 300 μm. In greater detail, the separator can be a woven or a non-woven fabric comprising an olefin-based polymer such as polypropylene or polyethylene; or a glass fiber.

In some embodiments, the electrolyte can be a liquid electrolyte and can include a polar aprotic solvent and a sodium salt in the solvent. The polar aprotic solvent can be dimethylether, diethylether, dimethyl carbonate, diethyl carbonate, ethylmethyl carbonate, dipropyl carbonate, methylpropyl carbonate, ethylpropyl carbonate, ethylene carbonate, propylene carbonate, butylene carbonate, fluoroethylene carbonate, methyl acetate, ethyl acetate, n-propyl acetate, dimethylacetate, methyl propionate, ethyl propionate, γ-butyrolactone, decanolide, valerolactone, mevalonolactone, caprolactone, dibutyl ether, tetraglyme, diglyme, polyethylene glycol dimethylether, dimethoxy ethane, 2-methyl tetrahydrofuran, 2,2-dimethyl tetrahydrofuran, 2,5-dimethyl tetrahydrofuran, cyclohexanone, triethylamine, triphenylamine, triether phosphine oxide, acetonitrile, dimethyl formamide, 1,3-dioxolane, and sulfolane, but the organic solvent is not limited thereto and any solvent that can be used as an organic solvent in the art can be used. In some embodiments, the solvent preferably comprises a carbonate ester, and more preferably comprises propylene carbonate.

The sodium salt used as the electrolyte can comprise, for example, $NaClO_4$, $NaPF_6$, $NaBF_4$, $NaCF_3SO_3$, $NaN(CF_3SO_2)_2$, $NaN(C_2F_5SO_2)_2$, $NaC(CF_3SO_2)_3$ and the like. In some embodiment, the liquid electrolyte preferably comprises $NaClO_4$, $NaPF_6$, or a combination thereof. The sodium salt is not limited to the foregoing and any salt that can be used as the sodium salt in the art can be used. For example, the salt used as the lithium salt in the lithium battery can have lithium substituted with sodium.

No particular limitation is imposed on the concentration of the sodium salt in the electrolyte solution.

In some embodiments, the battery can be a solid sodium battery which comprises a solid-state electrolyte. For example, the solid-state electrolyte can be an inorganic solid electrolyte, such as an oxide-type (e.g., NASICON or $Na_{1+x}Zr_2Si_xP_{3-x}O_{12}$, $0<x<3$) or a sulfide type (e.g., $Na_3PS_4$); or a polymer electrolyte, such as poly(ethylene oxide)$_8$:$NaAsF_6$. The solid-state electrolyte is not limited thereto, and any salt that can be used as the solid state sodium salt in the art can be used in the battery of the present disclosure.

The sodium ion battery can be manufactured by providing the positive electrode active material described above, providing a negative electrode, and disposing an electrolyte between the positive electrode and negative electrode to manufacture the sodium-ion battery. In some embodiment, the method can further comprise disposing a separator between the positive electrode and the negative electrode. For example, the sodium ion battery can be manufactured by sequentially laminating the negative electrode, the separator, and the positive electrode; winding or folding the laminated structures, then enclosing the wound or folded structure in a cylindrical or rectangular battery case or pouch, and subsequently disposing the liquid electrolyte into the battery case or pouch to provide the sodium ion battery. Disposing the liquid electrolyte into the case or pouch can be by, for example, injecting the liquid electrolyte.

This disclosure is further illustrated by the following examples, which are non-limiting.

Examples

The compounds shown in Table 1 are representative sodium complex oxide materials screened in the following Examples. Each of the compounds correspond to the Fddd space group. Each of the compounds in Table 1 were selected based on a computational models, and the properties discussed below were calculated using computational chemistry methods.

The compounds shown in Table 1 can be prepared by various methods including a solid state reaction method, a co-precipitation method, or a combustion method. Specifically, a prophetic procedure for the preparation of $Na_4Fe_2O_5$ of Table 1 is as follows. An aqueous solution of $Fe(COOCH_3)$ (0.2 molar concentration, 50 milliliters) is mixed with an aqueous solution of $Na_2CO_3$ (0.2 molar concentration, 50 milliliters). To the mixture, an aqueous solution of citric acid (0.3 molar concentration, 100 milliliters) and ethylene glycol (12 grams) is added. Subsequently, water is evaporated at a temperature of 80° C. The dried material is then subjected to a first heat treatment at a temperature of about 500° C. in air, and a second heat treatment at a temperature of about 700° C. in air to provide the desired compound. The same general procedure can be used to similarly obtain the additional compounds shown in Table 1.

The calculated voltage (V) and capacity (mAh/g) for each material are also listed in Table 1.

TABLE 1

| Formula | Voltage (V) | Capacity (mAh/g) |
|---|---|---|
| $Na_4Fe_2O_5$ | 3.3 | 377.96 |
| $Na_4Co_2O_5$ | 3.2 | 369.9 |
| $Na_8Fe_3CoO_{10}$ | 2.9 | 375.91 |
| $Na_{16}Fe_3Ni_5O_{20}$ | 2.9 | 373.27 |
| $Na_{16}Fe_5Ni_3O_{20}$ | 2.8 | 375.13 |
| $Na_{16}Cr_3Co_5O_{20}$ | 2.7 | 376.67 |
| $Na_4CrCoO_5$ | 2.7 | 378.98 |
| $Na_{16}FeNi_7O_{20}$ | 2.7 | 371.43 |
| $Na_8TiCo_3O_{10}$ | 2.7 | 377.1 |
| $Na_4Cr_2O_5$ | 2.6 | 388.5 |
| $Na_4Ni_2O_5$ | 2.6 | 370.52 |

As shown in Table 1, the voltage values for the materials tested range from 2.6 to 3.3 V. The energy capacity of the materials was at least 370 to 388 mAh/g. Such energy capacities are 54 to 62% greater than the capacity of known layered oxides (e.g., having a capacity of about 240 mAh/g).

Figure 2A:
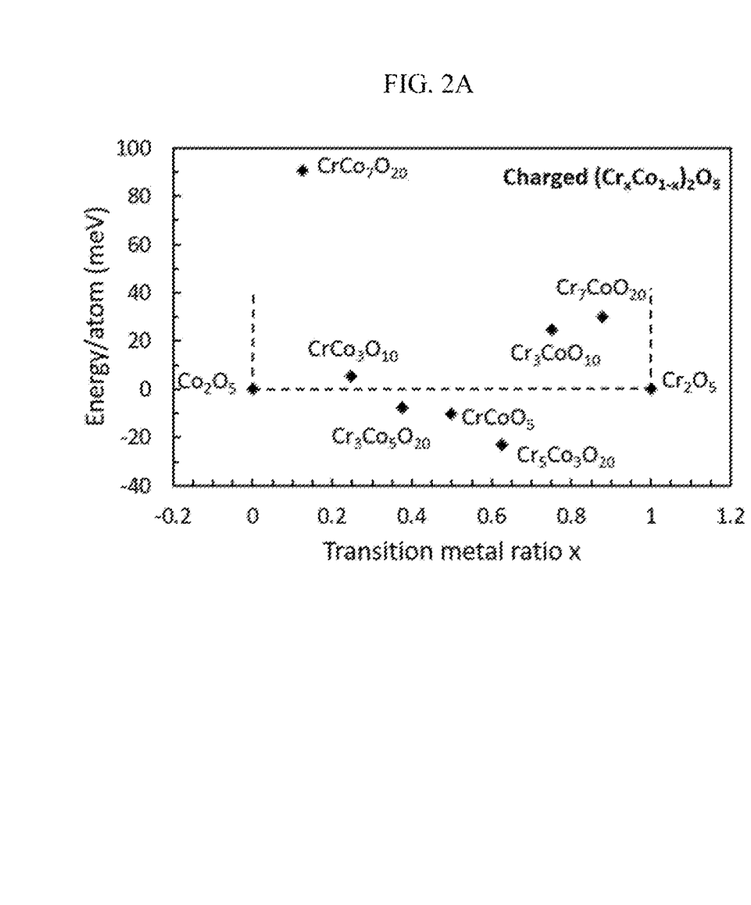
FIG. 2A is graph of energy per atom (millielectronvolts, meV) versus the transition metal atomic ratio and is a stability chart of Co—Cr mixtures in a charged state.
Figure 2B:
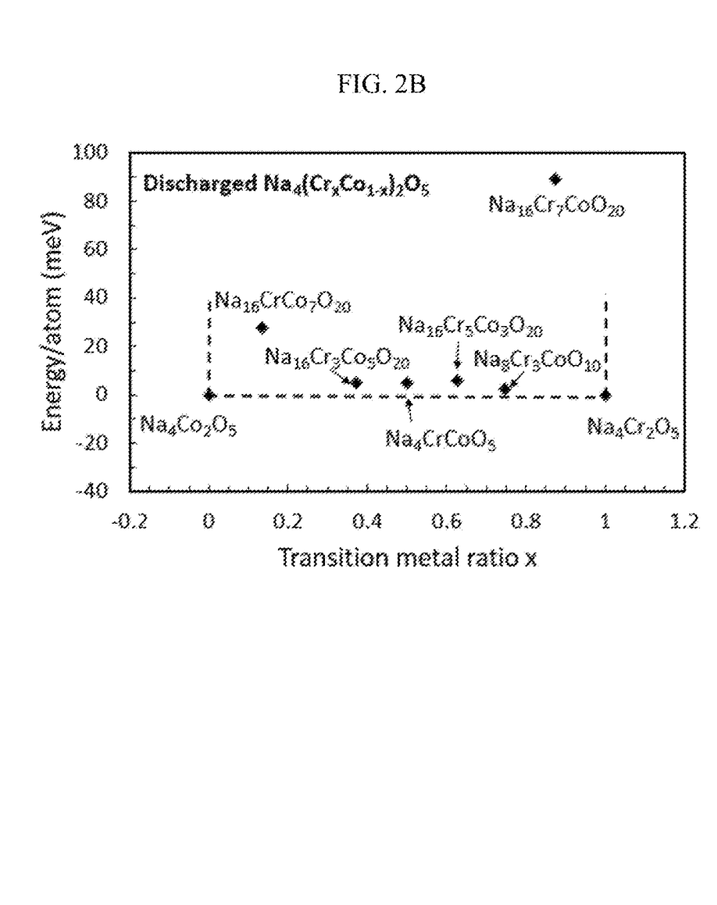
FIG. 2B is graph of energy per atom (millielectronvolts, meV) versus the transition metal atomic ratio and is a stability chart of Co—Cr mixtures in a discharged state.
Figure 3:
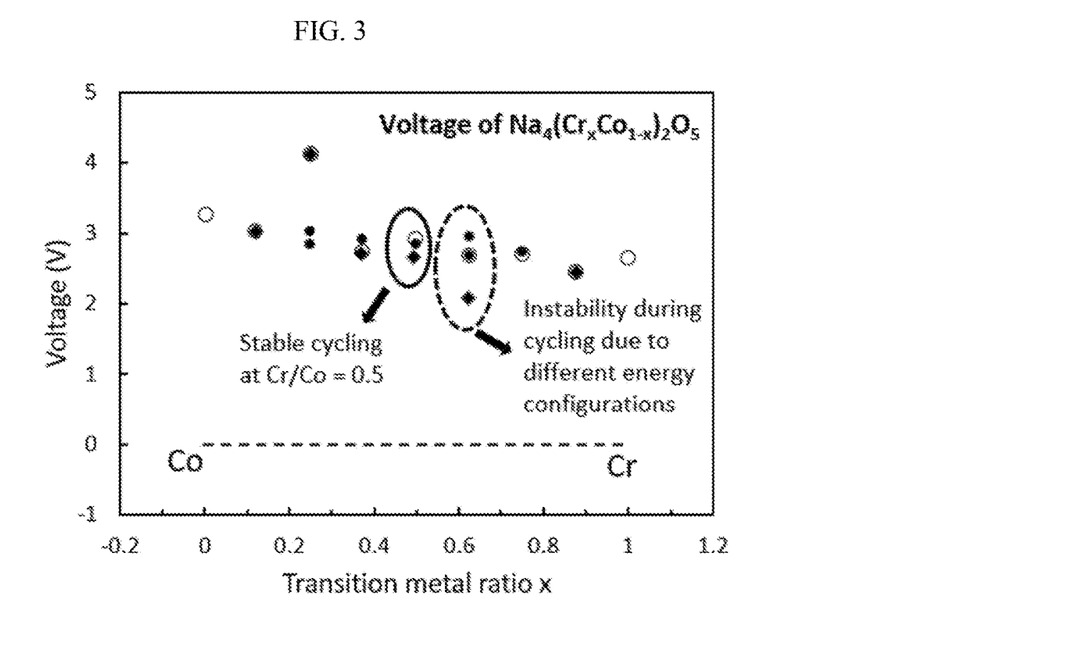
FIG. 3 is a graph of voltage (volts versus Na/Na$^+$) versus the transition metal ratio which shows the stability of Co—Cr mixtures.

The stability of various compounds was analyzed computationally. FIG. 2 shows the resulting stability charts for a sample compound $Na_4Cr_xCo_{1-x}O_5$, where x=0, 0.125, 0.25, 0.375, 0.5, 0.625, 0.75, 0.875, and 1.0. Two states of fully charged and fully discharged were calculated for all possible atomic configurations or arrangements for a model containing 8 formula units. The reference for relative stability screening are the end points corresponding to x=0 and x=1. From the charged plot (FIG. 2, left), the compound including $Cr_{0.625}Co_{0.375}$ emerges as one of the stable compounds whose mixture structure may be unstable under cycling. Mixture ratio of Cr/Co of 0.5 is not only seen to be stable with respect to x=0 and x=1, but also remains stable during cycling. That is, this compound passes the Mixture-Charging-Stability (MSC) criterion, as shown in FIG. 3.

Figure 4:
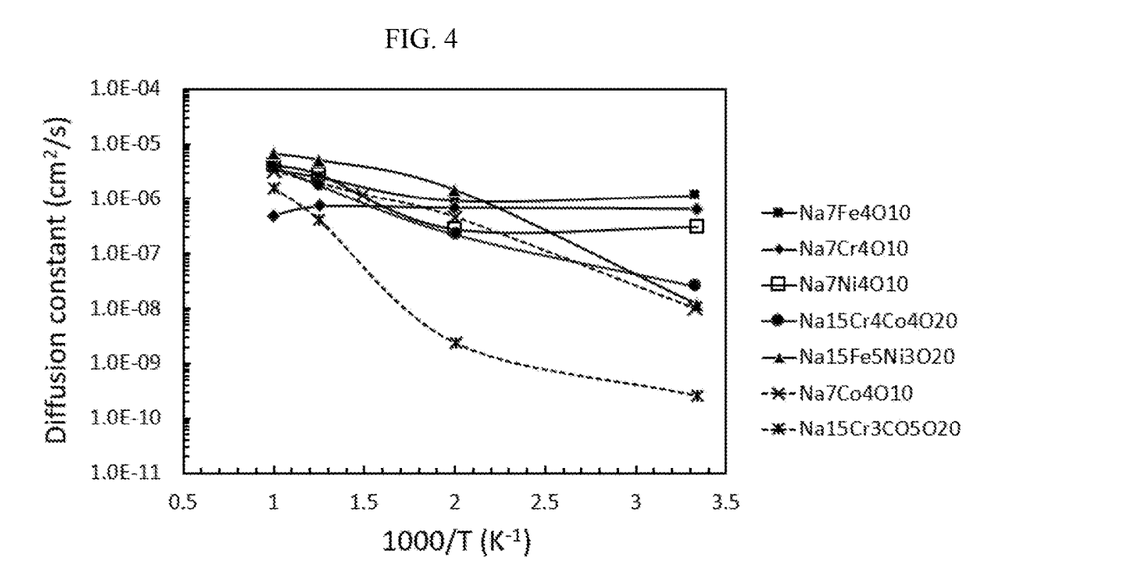
FIG. 4 is a graph of diffusion constant (D, cm$^2$/s) versus inverse temperature (1000/T, K$^{-1}$) which shows the diffusion constant for several calculated structures.

FIG. 4 shows the calculated ionic diffusion of suggested compounds at slightly de-sodiated conditions. The calculation was performed using highly accurate molecular dynamics simulations at various temperatures. At room temperature (1000/T≈3.3), the minimum value of Na diffusion is between $10^{-8}$ and $10^{-6}$.

Figure 6:
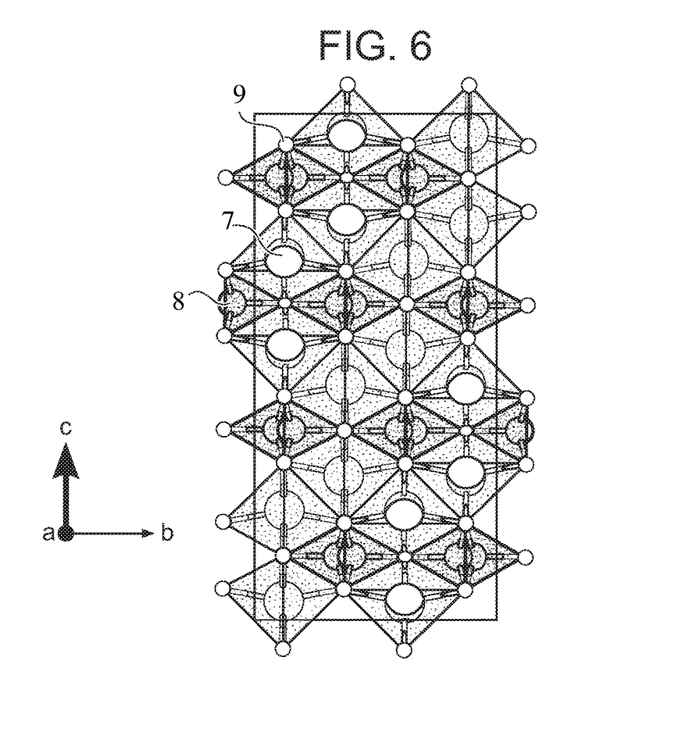
FIG. 6 shows an embodiment of the crystal structure of $Na_4M^1_2O_5$ when viewed from the be plane.
Figure 7:
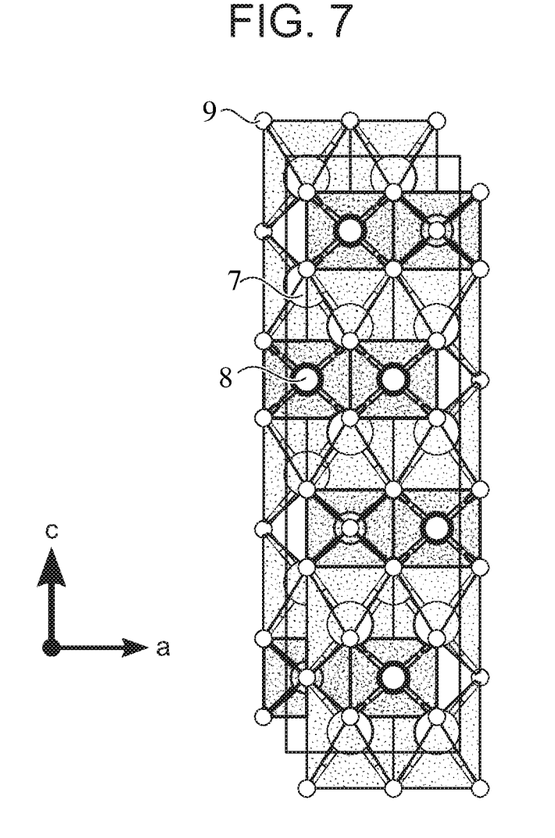
FIG. 7 shows an embodiment of a crystal structure of $Na_4M^1_2O_5$ when viewed from the ac plane.
Figure 8:
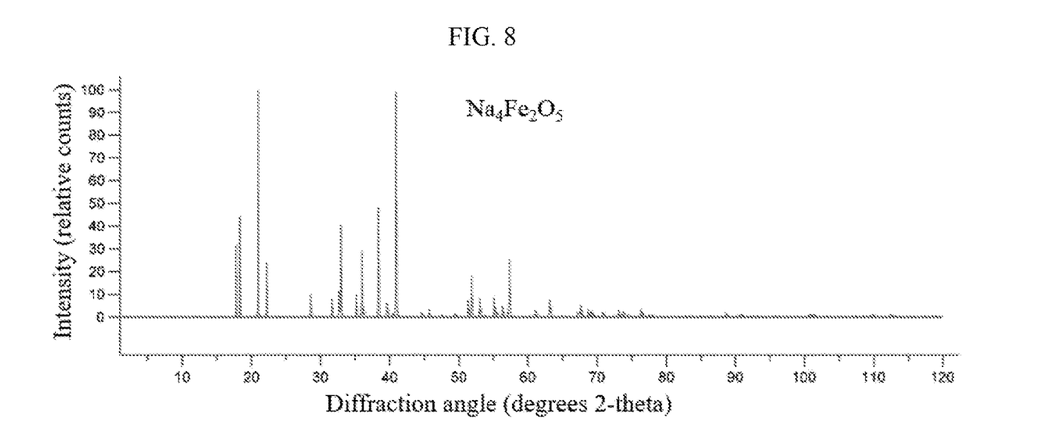
FIG. 8 is a graph of intensity (relative counts) versus diffraction angle (degrees 2-theta) and shows the results of X-ray diffraction analysis of $Na_4Fe_2O_5$.
Figure 9:
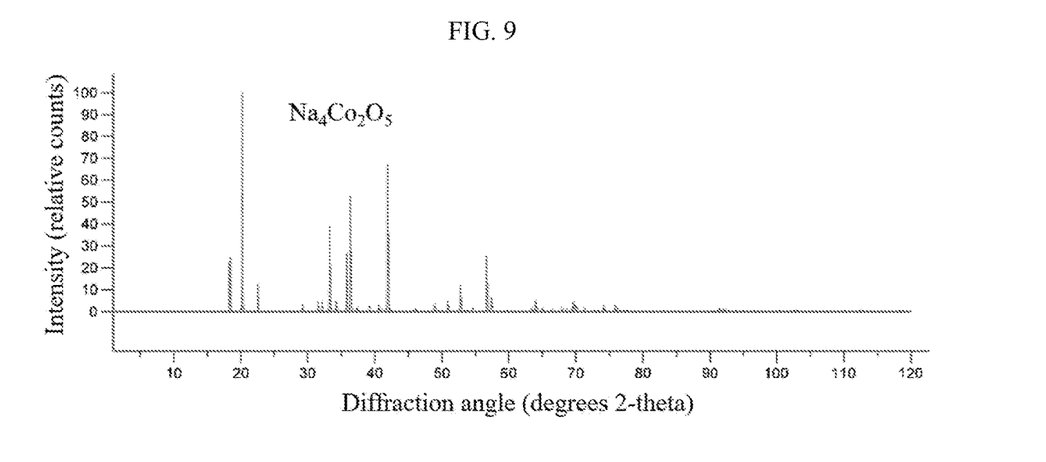
FIG. 9 is a graph of intensity (relative counts) versus diffraction angle (degrees 2-theta) and shows the results of X-ray diffraction analysis of $Na_4Co_2O_5$.
Figure 10:
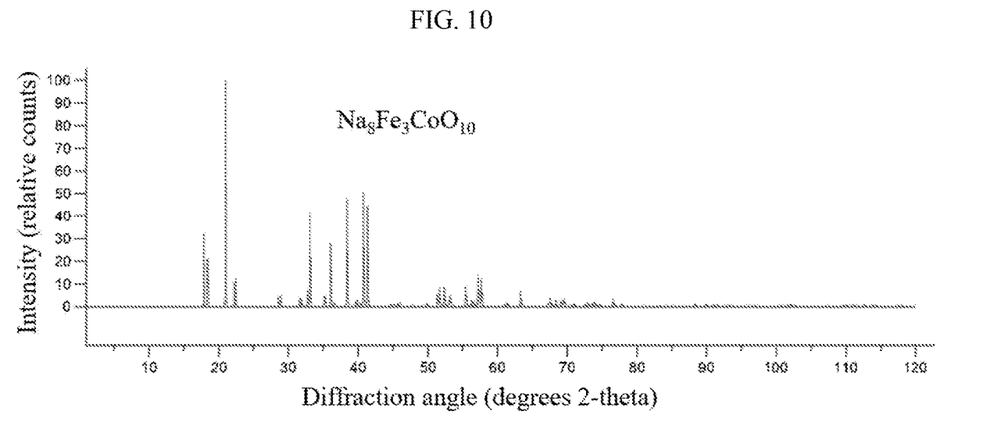
FIG. 10 is a graph of intensity (relative counts) versus diffraction angle (degrees 2-theta) and shows the results of X-ray diffraction analysis of $Na_8Fe_3CoO_{10}$.
Figure 11:
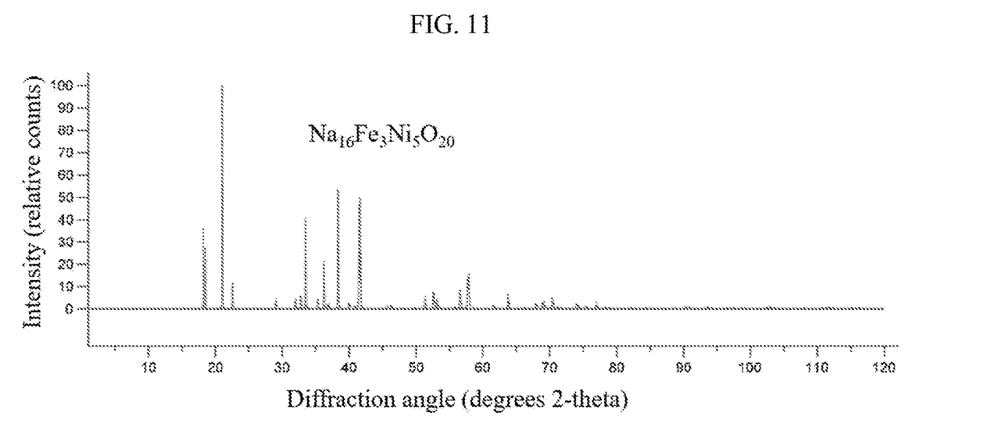
FIG. 11 is a graph of intensity (relative counts) versus diffraction angle (degrees 2-theta) and shows the results of X-ray diffraction analysis of $Na_{16}Fe_3Ni_5O_{20}$.
Figure 12:
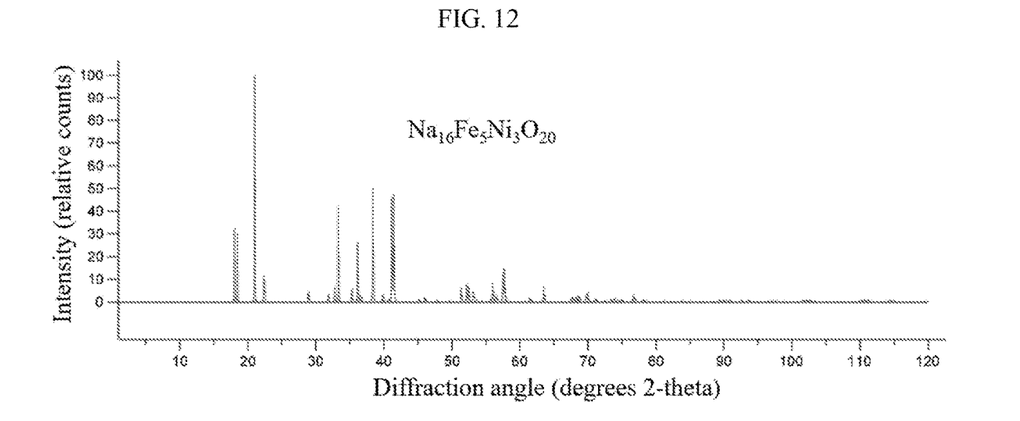
FIG. 12 is a graph of intensity (relative counts) versus diffraction angle (degrees 2-theta) and shows the results of X-ray diffraction analysis of $Na_{16}Fe_5Ni_3O_{20}$.
Figure 13:
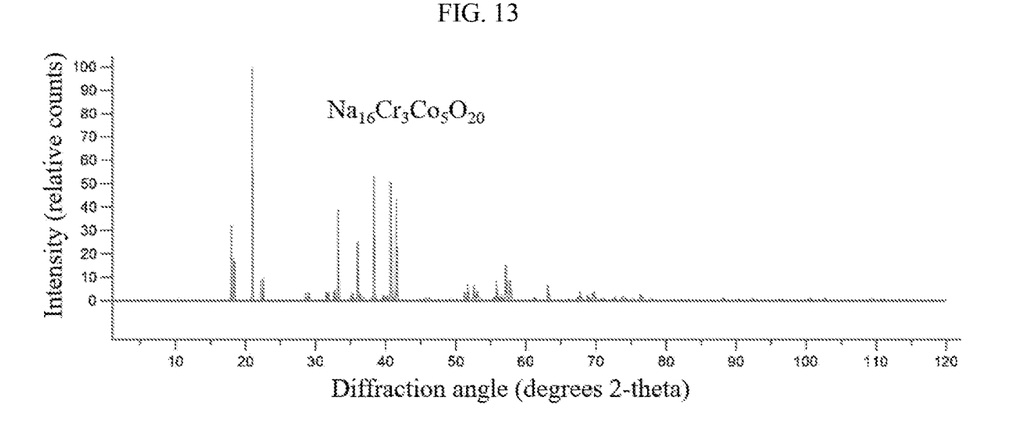
FIG. 13 is a graph of intensity (relative counts) versus diffraction angle (degrees 2-theta) and shows the results of X-ray diffraction analysis of $Na_{16}Cr_3Co_5O_{20}$.
Figure 14:
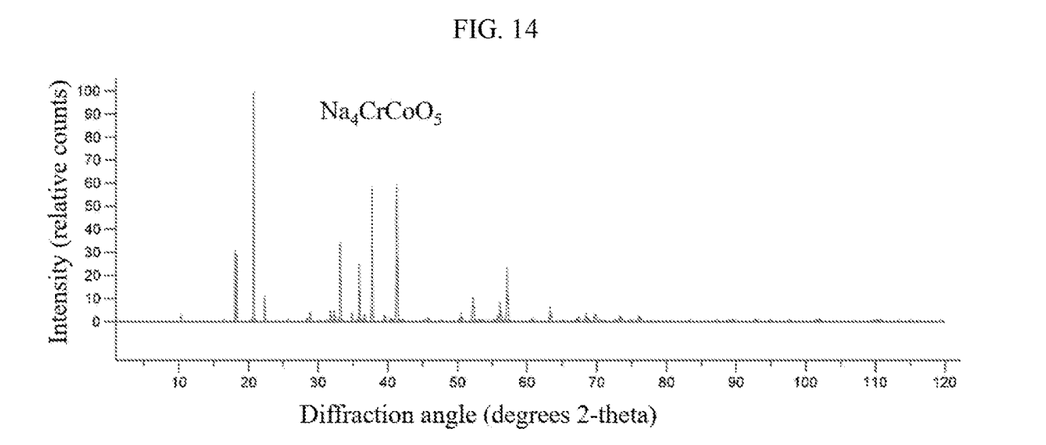
FIG. 14 is a graph of intensity (relative counts) versus diffraction angle (degrees 2-theta) and shows the results of X-ray diffraction analysis of $Na_4CrCoO_5$.
Figure 15:
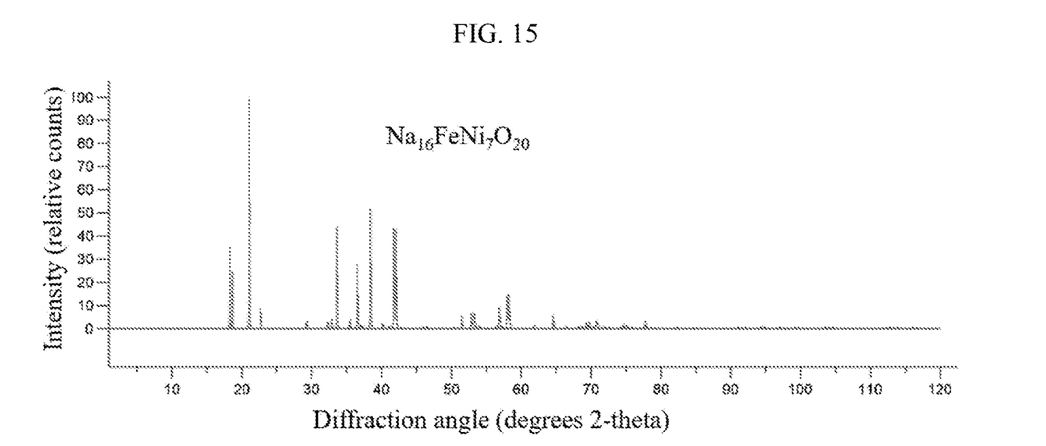
FIG. 15 is a graph of intensity (relative counts) versus diffraction angle (degrees 2-theta) and shows the results of X-ray diffraction analysis of $Na_{16}FeNi_7O_{20}$.
Figure 16:
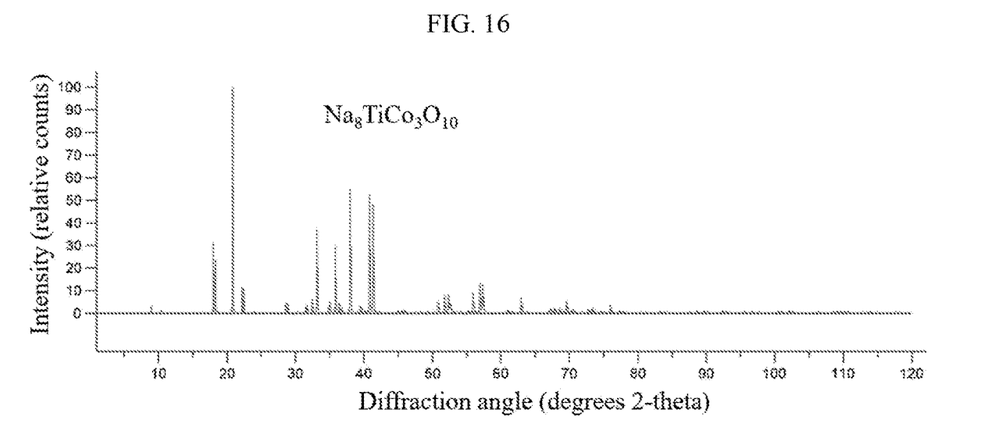
FIG. 16 is a graph of intensity (relative counts) versus diffraction angle (degrees 2-theta) and shows the results of X-ray diffraction analysis of $Na_8TiCo_3O_{10}$.
Figure 17:
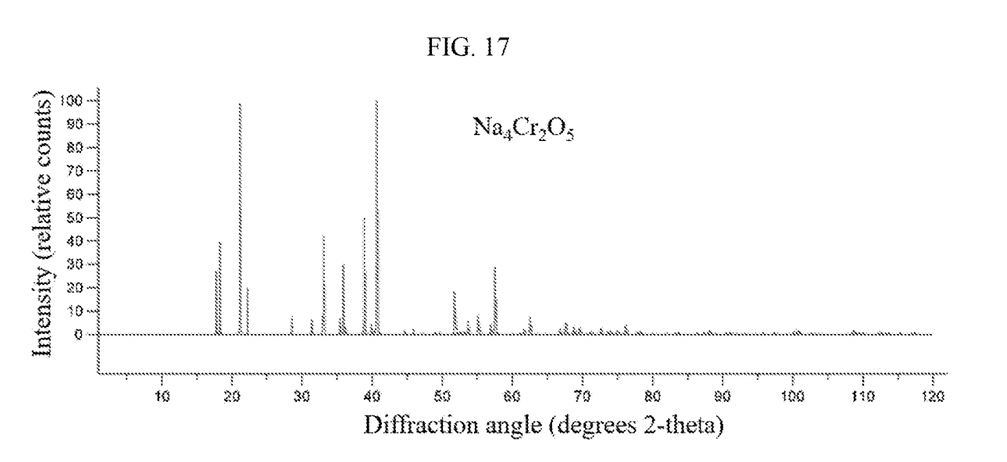
FIG. 17 is a graph of intensity (relative counts) versus diffraction angle (degrees 2-theta) and shows the results of X-ray diffraction analysis of $Na_4Cr_2O_5$.
Figure 18:
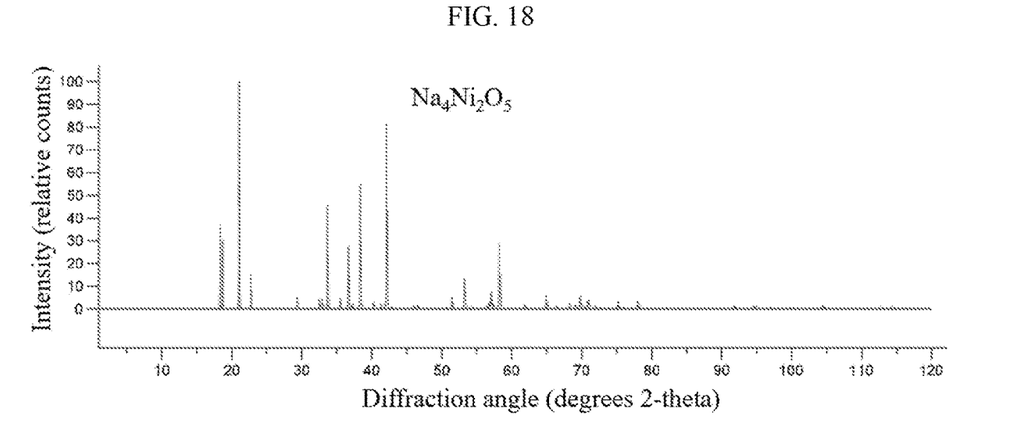
FIG. 18 is a graph of intensity (relative counts) versus diffraction angle (degrees 2-theta) and shows the results of X-ray diffraction analysis of $Na_4Ni_2O_5$.

FIGS. 5 and 6 are exemplary crystallographic views of a sodium complex oxide having the formula $Na_4M^1_2O_5$. FIG. 5 shows the view from the bc plane, and FIG. 6 shows the view from the ac plane. Na is indicated as "7", $M^1$ as "8", and O as "9".

The X-ray diffraction plots for each of the compounds listed in Table 1 are shown in FIG. 19-29. From these plots, it can be seen that each of the Table 1 compounds exhibit a major peak (i.e., a peak having an intensity of at least 50%) at one or more of 19 to 22 degrees 2θ, 32 to 35 degrees 2θ, 36 to 39 degrees 2θ, and 40 to 43 degrees 2θ when analyzed by powder X-ray diffraction using Cu Kα radiation, characteristic of having an orthorhombic crystal structure.

This disclosure further encompasses the following embodiments.

Embodiment 1: A positive electrode active material for a sodium-ion battery, the positive electrode active material comprising: a sodium complex oxide of the formula $Na_4(M^1_aM^2_{1-a})_2O_5$ having an orthorhombic crystal structure; wherein $M^1$ and $M^2$ are each independently Ti, Cr, Fe, Co, Ni, Mn, V, or a combination thereof, provided that $M^1$ and $M^2$ are different from each other; and $0 \leq a \leq 1$.

Embodiment 2: The positive electrode active material of embodiment 1, wherein $M^1$ and $M^2$ comprise Fe, Co, or a combination thereof.

Embodiment 3: The positive electrode active material of embodiment 2, wherein $M^1$ is Fe.

Embodiment 4: The positive electrode active material of embodiment 3, wherein $M^1$ is Fe and $M^2$ is Co or Ni.

Embodiment 5: The positive electrode active material of embodiment 2, wherein $M^1$ is Co and $M^2$ is Cr or Ti.

Embodiment 6: The positive electrode active material of any of embodiments 1 to 5, wherein $0 < a \leq 1$.

Embodiment 7: The positive electrode active material of any of embodiments 1 to 6, wherein a molar ratio of $M^1$ to $M^2$ is 7:1 to 1:7.

Embodiment 8: The positive electrode active material of embodiment 1, wherein the sodium complex oxide comprises $Na_4Fe_2O_5$, $Na_4Co_2O_5$, $Na_4Fe_{1.5}Co_{0.5}O_5$, $Na_4Fe_{0.75}Ni_{1.25}O_5$, $Na_4Fe_{1.25}Ni_{0.75}O_5$, $Na_4Cr_{0.75}Co_{1.25}O_5$, $Na_4CrCoO_5$, $Na_4Fe_{0.25}Ni_{1.75}O_5$, $Na_4Ti_{0.5}Co_{1.5}O_5$, $Na_4Cr_2O_5$, $Na_4Ni_2O_5$, or a combination thereof.

Embodiment 9: The positive electrode active material of any of embodiments 1 to 8, wherein in the crystal structure of the sodium complex oxide, sodium and $M^1$ are each independently coordinated by oxygen in a square pyramidal or trigonal pyramidal geometry.

Embodiment 10: The positive electrode active material of any of embodiments 1 to 9, wherein the sodium complex oxide has an Fddd space group.

Embodiment 11: The positive electrode active material of any of embodiments 1 to 10, wherein the electrode material exhibits an average voltage of 2.6 to 3.3 volts versus $Na/Na^+$.

Embodiment 12: The positive electrode active material of any of embodiments 1 to 11, wherein the electrode material exhibits a specific capacity of greater than 360 milliampere-hours per gram.

Embodiment 13: The positive electrode active material of any of embodiments 1 to 12, having a major peak at a diffraction angle of 19 to 22 degrees 2θ when analyzed by powder X-ray diffraction using Cu Kα radiation.

Embodiment 14: The positive electrode active material of any of embodiments 1 to 13, having a major peak at a diffraction angle of 32 to 35 degrees 2θ when analyzed by powder X-ray diffraction using Cu Kα radiation.

Embodiment 15: The positive electrode active material of any of embodiments 1 to 14, having a major peak at a diffraction angle of 36 to 39 degrees 2θ when analyzed by powder X-ray diffraction using Cu Kα radiation.

Embodiment 16: The positive electrode active material of any of embodiments 1 to 15, having a major peak at a diffraction angle of 40 to 43 degrees 2θ when analyzed by powder X-ray diffraction using Cu Kα radiation.

Embodiment 17: A sodium ion battery comprising the positive electrode active material of any of embodiments 1 to 16.

Embodiment 18: A sodium ion battery comprising: a positive electrode comprising the positive electrode active material of any of embodiments 1 to 16; a negative electrode; and an electrolyte between the positive electrode and negative electrode.

Embodiment 19: The sodium ion battery of embodiment 18, further comprising a separator disposed between the positive electrode and the negative electrode.

Embodiment 20: A method of manufacturing the positive electrode active material for a sodium-ion battery of any of embodiments 1 to 16, the method comprising: heat treating a sodium source and a material comprising $M^1$ and optionally $M^2$, wherein $M^1$ and $M^2$ are each independently Ti, Cr, Fe, Co, Ni, Mn, or V, provided that $M^1$ and $M^2$ are different from each other, to manufacture the positive electrode active material.

Embodiment 21: A method of manufacturing a sodium-ion battery, the method comprising: providing the positive electrode active material of any of embodiments 1 to 16; providing a negative electrode; and disposing an electrolyte between the positive electrode and negative electrode to manufacture the sodium-ion battery.

The compositions, methods, and articles can alternatively comprise, consist of, or consist essentially of, any appropriate components or steps herein disclosed. The compositions, methods, and articles can additionally, or alternatively, be formulated so as to be devoid, or substantially free, of any steps, components, materials, ingredients, adjuvants, or species that are otherwise not necessary to the achievement of the function or objectives of the compositions, methods, and articles.

All ranges disclosed herein are inclusive of the endpoints, and the endpoints are independently combinable with each other. "Combinations" is inclusive of blends, mixtures, alloys, reaction products, and the like. The terms "first," "second," and the like, do not denote any order, quantity, or importance, but rather are used to distinguish one element from another. The terms "a" and "an" and "the" do not denote a limitation of quantity, and are to be construed to cover both the singular and the plural, unless otherwise indicated herein or clearly contradicted by context. "Or" means "and/or" unless clearly stated otherwise. Reference throughout the specification to "some embodiments", "an embodiment", and so forth, means that a particular element described in connection with the embodiment is included in at least one embodiment described herein, and may or may not be present in other embodiments. In addition, it is to be understood that the described elements may be combined in any suitable manner in the various embodiments.

Unless defined otherwise, technical and scientific terms used herein have the same meaning as is commonly understood by one of skill in the art to which this application belongs. All cited patents, patent applications, and other references are incorporated herein by reference in their entirety. However, if a term in the present application contradicts or conflicts with a term in the incorporated reference, the term from the present application takes precedence over the conflicting term from the incorporated reference.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. A positive electrode active material for a sodium-ion battery, the positive electrode active material comprising:
a sodium complex oxide of the formula $$Na_4(M^1_a M^2_{1-a})_2 O_5$$

having an orthorhombic crystal structure;
wherein
$M^1$ and $M^2$ are each independently Ti, Cr, Fe, Co, Ni, combination thereof, provided that $M^1$ and $M^2$ are different from each other;
$0<a<1$; and
wherein a molar ratio of $M^1$ to $M^2$ is 7:1 to 1:7; and
wherein the electrode material exhibits an average voltage of 2.6 to 3.3 volts versus $Na/Na^+$.

2. The positive electrode active material of claim 1, wherein $M^1$ and $M^2$ comprise Fe, Co, or a combination thereof, provided that $M^1$ and $M^2$ are different from each other.

3. The positive electrode active material of claim 2, wherein $M^1$ is Fe.

4. The positive electrode active material of claim 3, wherein $M^1$ is Fe and $M^2$ is Co or Ni.

5. The positive electrode active material of claim 4, wherein the molar ratio of $M^1$ to $M^2$ is 3:1 to 1:3.

6. The positive electrode active material of claim 2, wherein $M^1$ is Co and $M^2$ is Cr or Ti.

7. The positive electrode active material of claim 1, wherein the sodium complex oxide comprises $Na_4Fe_{1.5}Co_{0.5}O_5$, $Na_4Fe_{0.75}Ni_{1.25}O_5$, $Na_4Fe_{1.25}Ni_{0.75}O_5$, $Na_4Cr_{0.75}Co_{1.25}O_5$, $Na_4CrCoO_5$, $Na_4Fe_{0.25}Ni_{1.75}O_5$, $Na_4Ti_{0.5}Co_{1.5}O_5$, or a combination thereof.

8. The positive electrode active material of claim 1, wherein in the crystal structure of the sodium complex oxide, sodium and $M^1$ are each independently coordinated by oxygen in a square pyramidal or trigonal pyramidal geometry.

9. The positive electrode active material of claim 1, wherein the sodium complex oxide has an Fddd space group.

10. The positive electrode active material of claim 1, wherein the electrode material exhibits a specific capacity of greater than 360 milliampere-hours per gram.

11. The positive electrode active material of claim 1, having a major peak at a diffraction angle of 19 to 22 degrees 2θ when analyzed by powder X-ray diffraction using Cu Kα radiation.

12. The positive electrode active material of claim 1, having a major peak at a diffraction angle of 32 to 35 degrees 2θ when analyzed by powder X-ray diffraction using Cu Kα radiation.

13. The positive electrode active material of claim 1, having a major peak at a diffraction angle of 36 to 39 degrees 2θ when analyzed by powder X-ray diffraction using Cu Kα radiation.

14. The positive electrode active material of claim 1, having a major peak at a diffraction angle of 40 to 43 degrees 2θ when analyzed by powder X-ray diffraction using Cu Kα radiation.

15. A sodium ion battery comprising the positive electrode active material of claim 1.

16. A sodium ion battery comprising:
a positive electrode comprising the positive electrode active material of claim 1;
a negative electrode; and
an electrolyte between the positive electrode and negative electrode.

17. The sodium ion battery of claim 16, further comprising a separator disposed between the positive electrode and the negative electrode.

18. A method of manufacturing the positive electrode active material for a sodium-ion battery of claim 1, the method comprising:
heat treating a sodium source and a material comprising $M^1$ and $M^2$, wherein $M^1$ and $M^2$ are each independently Ti, Cr, Fe, Co, Ni, provided that $M^1$ and $M^2$ are different from each other, to manufacture the positive electrode active material;
wherein the heat treating comprises a first heat treatment at a first temperature and a second, subsequent heat treatment at a second temperature that is higher than the first temperature.

19. A method of manufacturing a sodium-ion battery, the method comprising:
providing the positive electrode active material of claim 1;
providing a negative electrode;
and disposing an electrolyte between the positive electrode and negative electrode to manufacture the sodium-ion battery.

\* \* \* \* \*